United States Patent
Kowligy et al.

(10) Patent No.: US 12,228,769 B2
(45) Date of Patent: *Feb. 18, 2025

(54) PHOTONIC-CHIP BASED OPTICAL HETERODYNE DETECTION USING FREQUENCY COMBS

(71) Applicant: Vector Atomic, Inc., Pleasanton, CA (US)

(72) Inventors: Abijith Sudarsan Kowligy, Livermore, CA (US); Arman Cingoz, Pleasanton, CA (US); Jonathan David Roslund, Pleasanton, CA (US)

(73) Assignee: Vector Atomic, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/354,187

(22) Filed: Jul. 18, 2023

(65) Prior Publication Data

US 2025/0028118 A1 Jan. 23, 2025

(51) Int. Cl.
G02B 6/293 (2006.01)
G02F 1/35 (2006.01)
G04F 5/14 (2006.01)

(52) U.S. Cl.
CPC .......... *G02B 6/2938* (2013.01); *G02F 1/3528* (2021.01); *G02F 2203/56* (2013.01); *G04F 5/14* (2013.01)

(58) Field of Classification Search
CPC . G02B 6/2938; G02F 1/3528; G02F 2203/56; G04F 5/14
See application file for complete search history.

(56) References Cited

U.S. PATENT DOCUMENTS

| 7,809,222 B2 * | 10/2010 | Hartl | H01S 3/06716 |
| | | | 385/27 |
| 8,385,699 B2 | 2/2013 | Liu | |
| 10,859,889 B2 | 12/2020 | Zia et al. | |
| 2012/0133931 A1 * | 5/2012 | Fermann | G01J 3/10 |
| | | | 372/18 |
| 2017/0187161 A1 | 6/2017 | Fermann et al. | |
| 2018/0048113 A1 * | 2/2018 | Fermann | H01S 3/06712 |
| 2019/0267708 A1 * | 8/2019 | Tennant | H04B 10/505 |

(Continued)

FOREIGN PATENT DOCUMENTS

| EP | 4375744 A1 * | 5/2024 | |
| GB | 2625596 A * | 6/2024 | G01D 5/35361 |

OTHER PUBLICATIONS

D. Carlson et al., Photonic-Chip Supercontinuum with Tailored Spectra for Counting Optical Frequencies, Phys. Rev. Appl. 8, 014027 (2017).

(Continued)

*Primary Examiner* — Leslie C Pascal
(74) *Attorney, Agent, or Firm* — Patterson + Sheridan, LLP

(57) ABSTRACT

Embodiments herein describe combining multiple optical signals so these signals propagate in the same direction in the same optical mode and polarization. In one embodiment, the techniques discussed herein are used to combine a reference laser with a frequency comb so that supercontinuum generation can then be performed to increase the frequency range of the frequency comb so that it includes the frequency of the reference laser.

20 Claims, 7 Drawing Sheets

(56) References Cited

U.S. PATENT DOCUMENTS

2022/0334449 A1* 10/2022 Sacchetto ............. G02F 1/2257

OTHER PUBLICATIONS

E. Lamb et al., Optical-Frequency Measurements with a Kerr Microcomb and Photonic-Chip Supercontinuum, Phys. Rev. Appl. 9, 024030 (2018).
European Patent Office, Extended European Search Report for European Patent Application No. 24176284.8, dated Nov. 14, 2024.
Sekhar et al., 20 GHz fiber-integrated femtosecond pulse and supercontinuum generation with a resonant electro-optic frequency comb, arXiv:2303.11523v1 [physics.optics] Mar. 21, 2023.
Vanmol et al., Mode-field Matching Down-Tapers on Single-Mode Optical Fibers for Edge Coupling Towards Generic Photonic Integrated Circuit Platforms, Journal of Lightwave Technology, vol. 38, No. 17, Sep. 1, 2020.

* cited by examiner

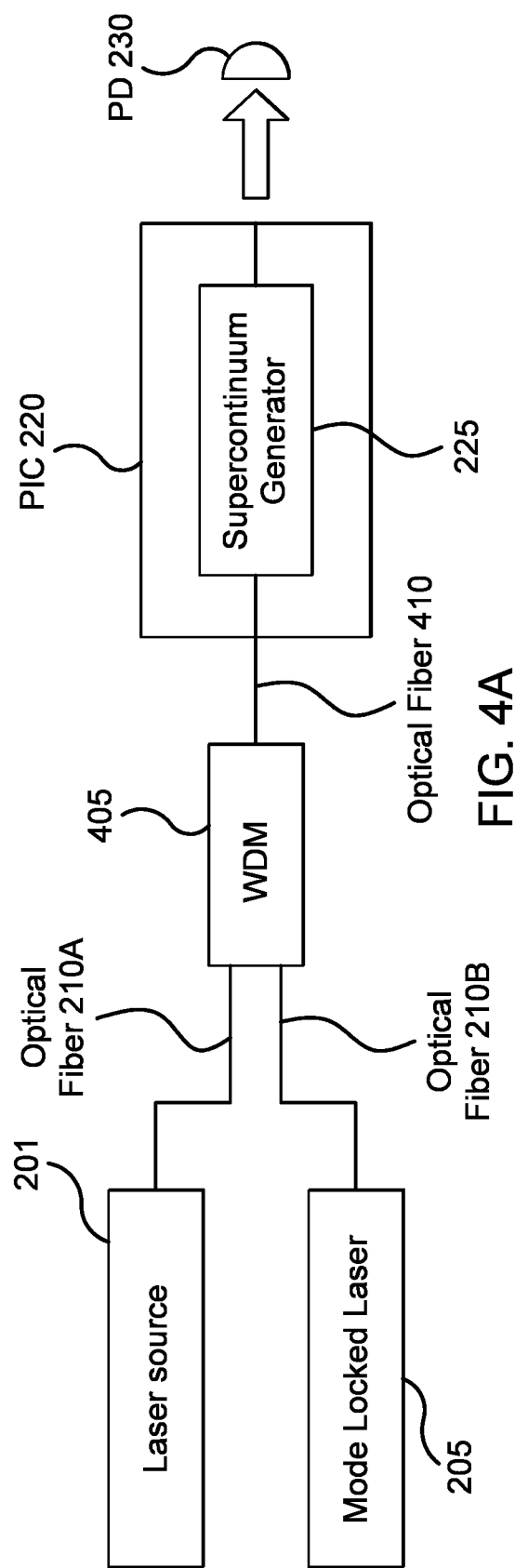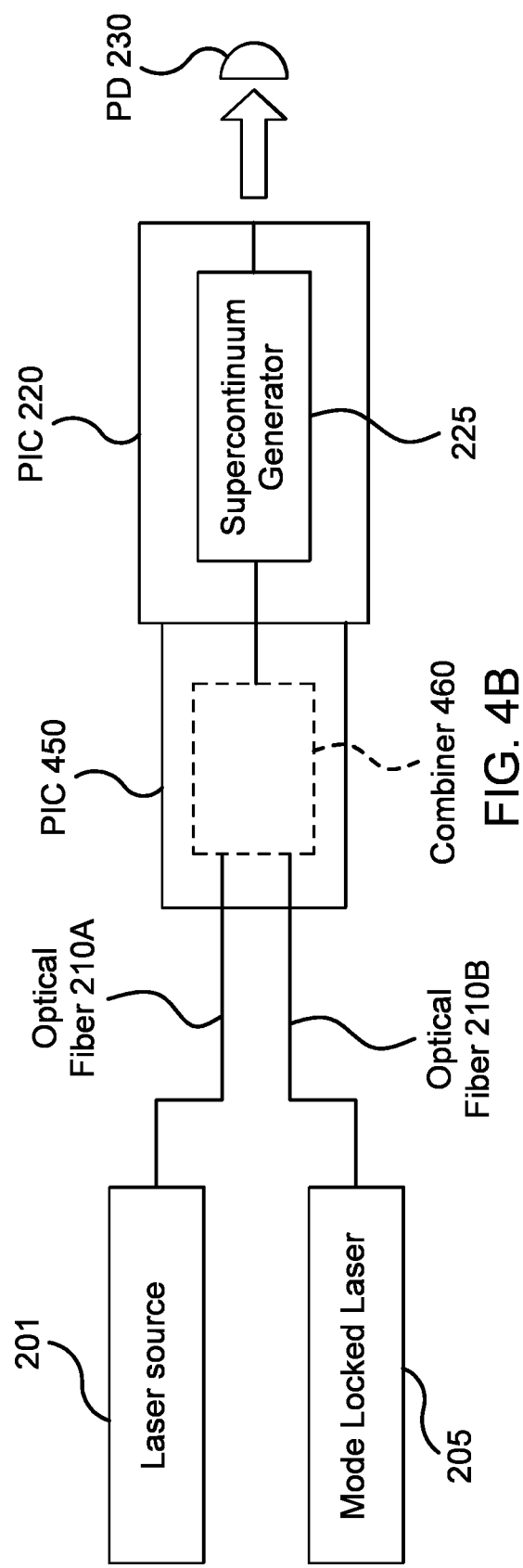

PHOTONIC-CHIP BASED OPTICAL HETERODYNE DETECTION USING FREQUENCY COMBS

STATEMENT OF GOVERNMENT INTEREST

This invention was made with government support under contract W56KGU-21-C-0017 awarded by the United States Army Research Labs and under contract 80NSSC21C0583 awarded by the National Aeronautics and Space Administration (NASA). The government has certain rights in the invention.

BACKGROUND

Field

Embodiments of the present invention generally relate to combining optical signals before performing supercontinuum generation.

Description of the Related Art

Optical atomic clocks offer improved frequency instabilities compared to microwave frequency standards due to the higher quality factor Q associated with an optical resonance. Many atomic clocks use an optical frequency comb laser to generate a high-precision electrical clock signals. To stabilize one of the two degrees of freedom for the frequency comb, a single comb tooth is often locked to a high precision clock reference laser by interferometrically combining the two optical signals and detecting the resultant heterodyne radio frequency (RF) beatnote on a photodetector.

However, in many instances the frequency of the reference laser is outside the frequency range of the frequency comb. In that case, supercontinuum generation using photonics integrated circuits (PICs) can be an efficient way to convert the frequency comb to a very broad spectral bandwidth that includes the frequency of the reference laser. Typically, the supercontinuum output of the PIC is interferometrically combined with the reference laser using free-space bulk optics, which is difficult to align and is sensitive to vibrations. Alternatively, the PIC output can be collected on an optical fiber and combined with the reference laser using telecom components. While the latter method is more robust, fiber coupling the PIC output is difficult and leads to excess insertion loss.

SUMMARY

One embodiment described herein is a photonic integrated circuit (PIC) comprising a supercontinuum generator, a combiner configured to combine a reference laser and a frequency comb where an output of the combiner is coupled to an input of the supercontinuum generator, and the combiner is one of: an optical component separate from the PIC or integrated into the PIC.

Another embodiment described herein is a method that includes combining a reference laser and a frequency comb to generate a combined optical signal and performing supercontinuum generation on the combined optical signal.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 4A is a block diagram of combining a reference laser and a frequency comb using a wavelength division multiplexer, according to one embodiment described herein.

FIG. 4B is a block diagram of combining a reference laser and a frequency comb using a photonic chip, according to one embodiment described herein.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments herein describe optically combining multiple optical signals so these signals propagate in the same direction in the same optical mode and polarization before performing supercontinuum generation. As mentioned above, combining optical signals after performing supercontinuum generation is difficult to achieve using bulk free-space interferometer optics and is often not robust to vibrations or shock. In the embodiments herein, at least two optical signals are combined at the input of a PIC either off-chip using telecommunication components (e.g., commercially available wavelength division multiplexers (WDM)) or on-chip using optical combiners. These strategies are relatively easy to implement, low cost, and robust to vibrations and movement. Moreover, because the optical combining is done before supercontinuum generation and the optical signals co-propagate with the same optical mode, the optical interference is readily available at the output of the PIC which can simply be detected on a photodetector after appropriate optical filtering.

In one embodiment, the techniques discussed herein are used to combine a reference laser with a frequency comb so that supercontinuum generation can then be performed to increase the frequency range of the frequency comb so that it includes the frequency of the reference laser. The stabilized or locked frequency comb can then be converted into a high-precision electrical clocking signal.

The embodiments herein also include an optical bench and filters for filtering and detecting the optical signal resulting from performing supercontinuum generation. For example, the optical bench can include a holder for aligning lenses, a filter, and a photodiode on a photonic chip containing a supercontinuum generation waveguide. The alignment tolerances on coupling light from the PIC into the photodetector are much less stringent in comparison to interferometer optics and is accomplished by the passive alignment afforded by the fabrication tolerances of the holder.

Figure 1:
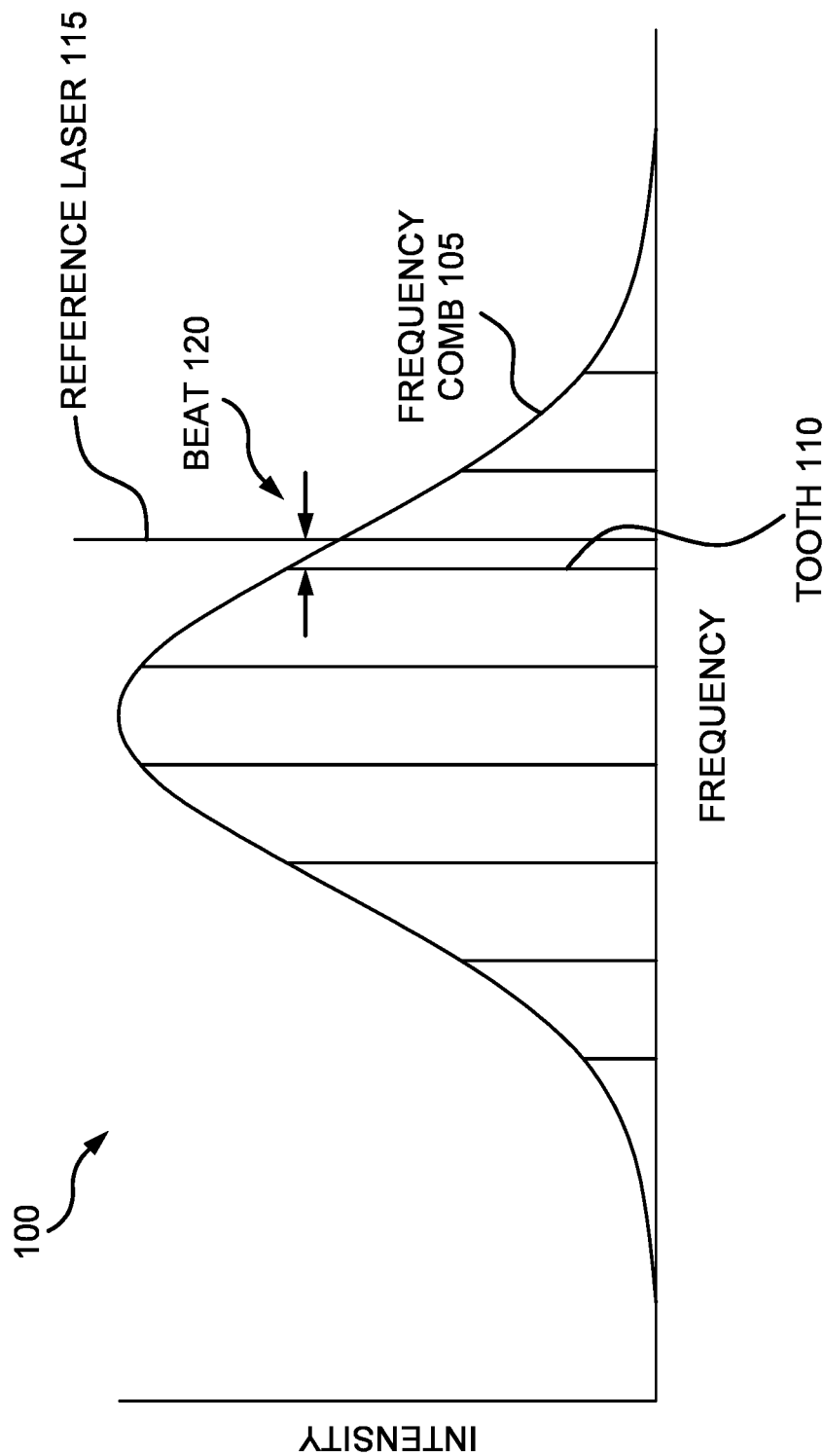
FIG. 1 illustrates locking a reference laser to a tooth in a frequency comb, according to one embodiment described herein.

FIG. 1 is a chart 100 that illustrates locking a reference laser 115 to a comb tooth 110 in a frequency comb 105, according to one embodiment described herein. A frequency comb is a laser source whose spectrum includes a series of discrete, equally spaced frequency lines—i.e., comb teeth 110. Frequency combs can be generated by a number of mechanisms, including periodic modulation (in amplitude and/or phase) of a continuous-wave laser, four-wave mixing in nonlinear media, or stabilization of the pulse train generated by a mode-locked laser. In this example, one of the two degrees of freedom for the frequency comb 105 is being stabilized (or locked to) the reference laser 115.

The chart 100 illustrates a beat 120 that is the difference between the reference laser 115 and the closest tooth 110 of the frequency comb 105. When detected using a photodiode, the beat 120 (also referred to as a beat note or a heterodyne signal) between the reference laser 115 and the tooth 110 can be detected and used to adjust the frequency comb 105 so that the tooth 110 aligns with the reference laser 115 (e.g., has the same frequency or is offset by a fixed value). Put differently, the beat 120 or beat note is an error signal for creating a lock between the reference laser 115 and the frequency comb 105. In one embodiment, the reference laser 115 may be stabilized using a spectroscopy technique that precisely aligns the reference laser 115 to a known frequency using, for example, an atomic vapor cell. In another embodiment, the reference laser 115 may be stabilized to an optical cavity. That way, aligning the frequency comb 105 to the reference laser 115 ensures the tooth 110 of the frequency comb 105 has a known frequency.

However, when generated, the reference laser 115 may have a frequency that is outside the frequency range of the frequency comb 105. Put differently, the reference laser 115 may be outside the optical bandwidth of frequency comb 105. As just one example, the reference laser 115 may be a 1064 nm Iodine clock laser but the frequency comb is a 1550 nm laser with a frequency range of approximately +/−25 nm (e.g., an envelope from 1525 to 1575 nm). As shown by chart 100, the reference laser 115 should have a frequency within the envelope of the frequency comb 105 in order for the reference laser 115 to be aligned with one of the teeth 110.

In the case where the reference laser 115 is outside the optical bandwidth of the frequency comb 105, nonlinear processes (e.g., second harmonic generation or supercontinuum generation) can be used to extend the wavelength of the frequency comb 105 to the wavelength of the reference laser 115 so they overlap as shown in chart 100. One of the most efficient ways to implement these nonlinear processes is using a photonic chip or photonic integrated circuit (PIC). However, as discussed above, optically combining the PIC-based supercontinuum generation with the optical reference is much more challenging compared to, for example, fiber-based supercontinuum generation where light sources can easily be combined using fiber optic components. The embodiments below describe various techniques for combining the two signals before the supercontinuum generation which leads to beatnote generation directly out of the PIC.

Figure 2:
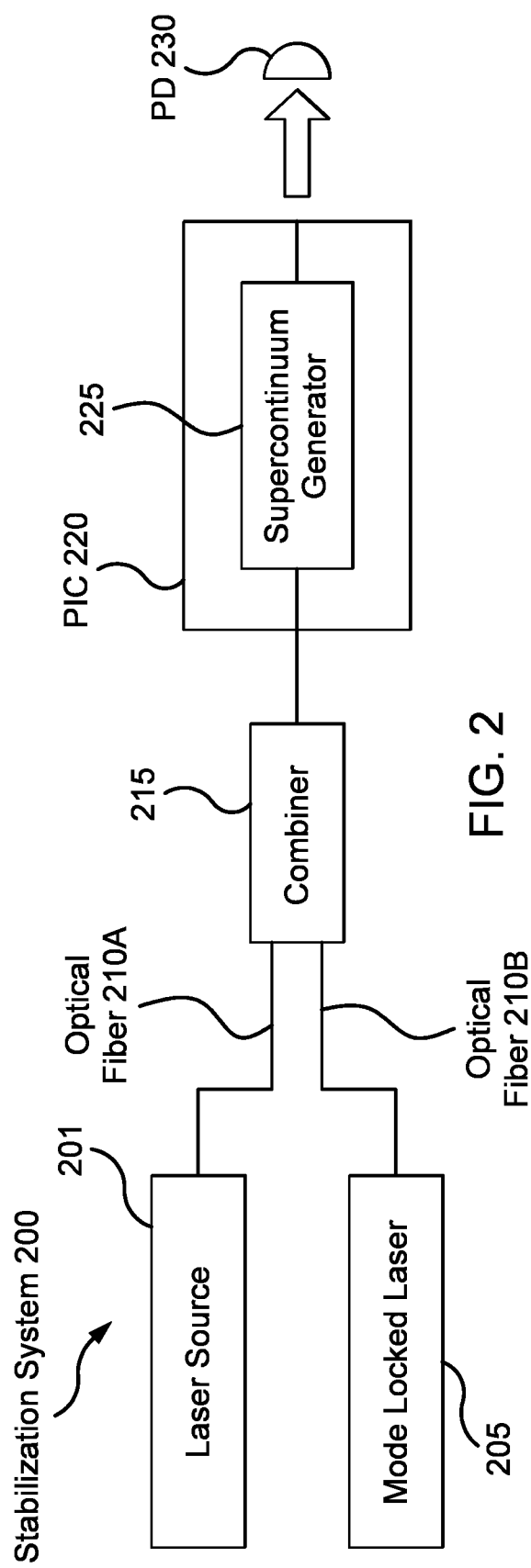
FIG. 2 is block diagram of combining a reference laser and a frequency comb before performing supercontinuum generation, according to one embodiment described herein.

FIG. 2 is a block diagram of optically combining the reference laser and a frequency comb before performing supercontinuum generation, according to one embodiment described herein. In this example, the frequency comb is generated by a mode-locked laser 205. However, the embodiments herein are not limited to any particular technique for generating the frequency comb.

A first polarization maintaining single-mode optical fiber 210A transmits the reference laser from a laser source 201 (e.g., a laser source stabilized to an atomic or optical reference) to a combiner 215 while a second polarization maintaining single-mode optical fiber 210B transmits the frequency comb generated by the mode-locked laser 205 to the combiner 215. In this embodiment, the combiner 215 is separate from a PIC 220 that includes a supercontinuum generator 225. That is, the combiner 215 (e.g., a 50:50 directional coupler, Y junction, or WDM) can be a separate optical component that combines the reference laser and the frequency comb. Different implementations of the combiner 215 are discussed in FIGS. 4A and 4B.

The combiner 215 outputs an optical signal that is a combination of the reference laser and the frequency comb. The combiner 215 can then transfer this optical signal to the PIC 220 using either an optical fiber (as shown in FIG. 4A) or a waveguide on the PIC (as shown in FIG. 4B). In one embodiment, the output of the combiner 215, which may be another polarization maintaining fiber or waveguide, guides the frequency comb and the reference wavelengths in the same spatial mode such that once supercontinuum light at the reference laser wavelength is generated, there will be an interferometric overlap between the two light sources (i.e., the signals are interferometrically combined at the output of the PIC 220).

The supercontinuum generator 225 in the PIC 220 extends the wavelength of the frequency comb to include the wavelength of the reference laser. The resulting optical signal is then detected using a photodiode (PD) 230 which can be processed by a computing device to detect the beat or beat note as shown in FIG. 1 between the reference laser and at least one tooth in the frequency comb.

The embodiments herein generally describe performing supercontinuum generator using a supercontinuum generator in a PIC, but are not limited to any particular type of platform or structure. In one embodiment, the supercontinuum generator 225 is a waveguide. For example, the PIC 220 may be a nonlinear optical integrated photonic platform that includes a supercontinuum generation waveguide formed from silicon nitride (SiN), Tantala ($Ta_2O_5$), lithium niobate ($LiNbO_3$), lithium niobate on SiN, aluminum nitride, gallium phosphide, silicon, gallium arsenide, or any heterogeneous combination of these platforms.

Figure 3:
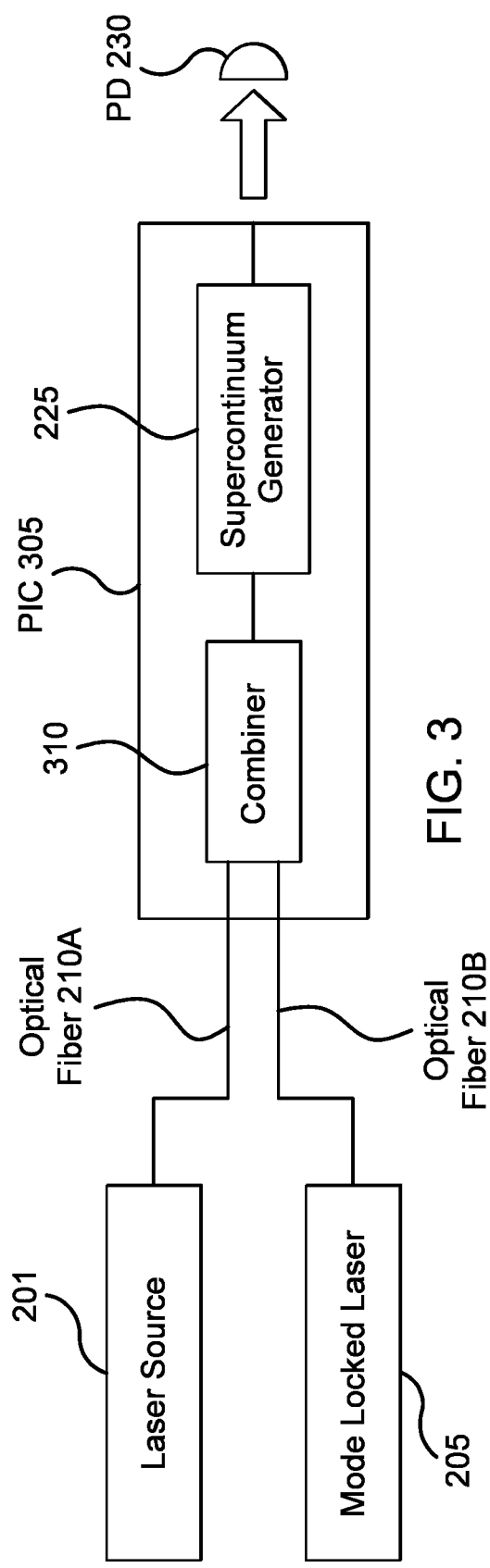
FIG. 3 is block diagram of combining a reference laser and a frequency comb before performing supercontinuum generation, according to one embodiment described herein.

FIG. 3 is block diagram of combining a reference laser and a frequency comb before performing supercontinuum generation, according to one embodiment described herein. Like in FIG. 2, the first optical fiber 210A transmits the reference laser generated by the laser source 201 to a combiner 310 while the second optical fiber 210B transmits the frequency comb generated by the mode-locked laser 205 to the combiner 310. In this embodiment, the combiner 310 (e.g., a 50:50 directional coupler, Y junction, or WDM) is part of a PIC 305. That is, the combiner 310 is integrated into the same PIC 305 that also includes the supercontinuum generator 225. Put differently, combining the reference laser and the frequency comb is performed in the same PIC 305 that performs the supercontinuum generation, unlike in FIG. 2 where the optical signals are combined in a separate optical component.

However, in both FIGS. 2 and 3, the optical signals are combined before supercontinuum generation is performed. Example implementations of integrating the combiner 310 into the PIC 305 are discussed in FIG. 5.

Like in FIG. 2, the optical signal produced by the supercontinuum generator 225 is then detected by the PD 230. The electrical output of the PD 230 is then processed by a computing device (e.g., analog or digital servo loops, a digital processor, FPGA, counter, etc.) to detect the beat or beat note between the reference laser and at least one tooth in the frequency comb.

Optically combining the reference laser and the frequency comb as shown in FIGS. 2 and 3 to the same waveguide simplifies obtaining the heterodyne (beat) signal, reduces linear loss, and provides a high signal-to-noise ratio beat signal through implicit mode-matching by the waveguide of the PIC. Another non-limiting advantage includes providing spatial mode filtering by the waveguide when both sources are at the input in the same fiber which eliminates any mode-matching optics at the output. Moreover, polarization-maintaining optical fibers 210 and waveguide can be used to ensure co-polarized light sources. By combining the signals before performing supercontinuum generation, another non-limiting advantage includes using all the comb light and all the reference laser light as opposed to a 90:10 or 50:50 coupler at the output of supercontinuum generation.

Moreover, the embodiments herein are agnostic to the choice of the frequency comb wavelength and clock laser wavelength. That is, by using supercontinuum generation, any choice of frequency comb wavelength and reference laser wavelength can be overlapped so the beat note can be detected. Some example wavelengths for the reference laser include 1064 nm (Iodine), 1157 nm (Ytterbium), 1068 nm (Aluminum ion), 1378 nm and 1396 nm (Strontium), or 689 and 698 nm (Strontium). Some example wavelengths for the frequency comb include 2 um (Thulium), 1.5 um (Erbium), 1.064 um (Ytterbium), 1.030 um (Ytterbium), 800 nm (Titanium: Sapphire). Any combinations of these wavelengths (and others) can be used in the various embodiments discussed herein.

FIG. 4A is a block diagram of combining a reference laser and a frequency comb using a WDM 405, according to one embodiment described herein. The WDM 405 includes two inputs that receive the optical fibers 210A and 210B that transmit the reference laser and the frequency comb. The WDM 405 also has an output that couples to a third optical fiber 410 which is coupled to a waveguide in the PIC 220. For example, the optical fiber 410 may be butt coupled to an edge of the PIC 220 or may be coupled to a top surface of the PIC 220 using a grating coupler.

In one embodiment, the WDM 405 is an off-the-shelf optical component. For example, the wavelength/frequency of the reference laser and the frequency comb may share the same wavelength/frequency of telecommunication signals. For example, the 1064 nm and the 1550 nm wavelengths are often used in the telecommunication industry. Thus, if the reference laser and the frequency comb are at these wavelengths, a commercial WDM 405 used in telecommunications can be used to combine the reference laser and a frequency comb. This can greatly reduce cost.

Further, aligning optical fibers 210 to the inputs of an off-the-shelf WDM 405 is a relatively easy task compared to aligning fibers 210 to the PIC 220 where there may be a very large mode size mismatch. Thus, FIG. 4A has the advantage of aligning only one optical fiber (e.g., fiber 410) to the PIC 220 while the embodiment in FIG. 5 (where the combiner is integrated into the PIC) aligns two optical fibers to the PIC. Once transmitted into the PIC, the waveguides in the PIC 220 mode match the reference laser and the frequency comb.

FIG. 4B is a block diagram of optically combining the reference laser and a frequency comb using a PIC 450, according to one embodiment described herein. As shown, the PIC 450 is separate from the PIC 220. In one embodiment, the PIC 450 is a different photonic platform than the PIC 220. As mentioned above, the PIC 220 may include a platform that can perform supercontinuum generation—e.g., a generator 225 formed from SiN, lithium niobate, aluminum nitride, tantala, etc. The PIC 450, in contrast, may be a photonic platform with similar core sizes as the optical fibers 210 (e.g., glass). As such, the mode size of the waveguides in the PIC 450 may be the same as (or very similar to) the mode size of the optical fibers 210. This makes aligning the optical fibers 210 to the PIC 450 much easier than aligning fibers to the PIC 220 which may have waveguides with much smaller mode sizes. Thus, like FIG. 4A, FIG. 4B has the advantage of having to align only one optical signal into the PIC 220 in contrast to FIG. 5.

In this example, the PIC 450 includes an optical combiner 460, which may be a Y junction, 50:50 directional coupler, or an on-chip WDM. The output of the optical combiner 460 can be aligned with a waveguide in the PIC 220. For example, an optical interface of the PIC 450 may be butt coupled to an optical interface at an edge of the PIC 220. In one embodiment, there may be a small gap between the PICs 450 and 220 that permit free-space transmission of the optical signal from the PIC 450 to the PIC 220. In one embodiment, one or more lenses may be used to transmit the optical signal from the PIC 450 to the PIC 220.

Thus, FIGS. 4A and 4B illustrate different implementations of the combiner 215 in FIG. 2 that is separate from the PIC 220 that includes the supercontinuum generator 225.

Figure 5:
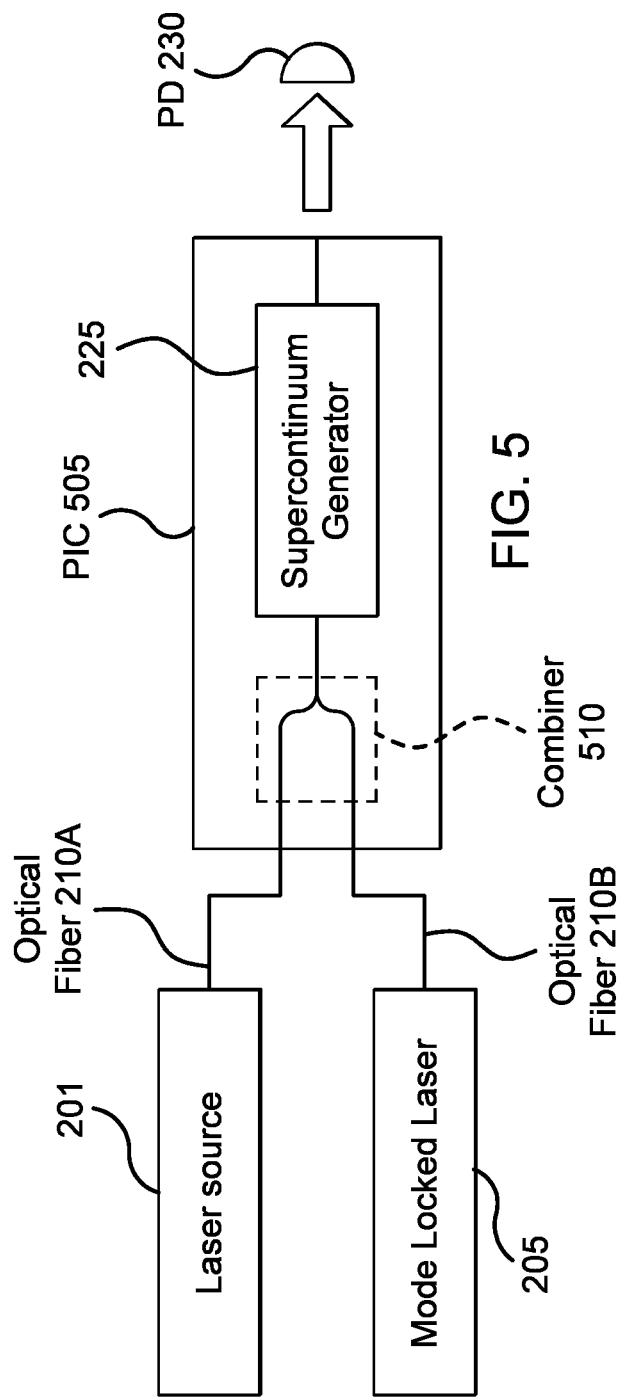
FIG. 5 is a block diagram of combining a reference laser and a frequency comb using a photonic chip that performs supercontinuum generation, according to one embodiment described herein.

FIG. 5 is a block diagram of combining a reference laser and a frequency comb generated by a mode-locked laser 205 using a PIC 505 that performs supercontinuum generation, according to one embodiment described herein. In this example, the optical fibers 210 that transmit the reference laser and the frequency comb are aligned with the PIC 505. This could occur at an edge of the PIC 505—e.g., by butt coupling or using one or more lenses—or could occur at a top surface of the PIC 505 using grating couplers.

The PIC 505 includes an optical combiner 510, which may be a Y junction, 50:50 directional coupler, or an on-chip WDM. In this example, the optical combiner 510 may be formed using the same material (or materials) that form the supercontinuum generator 225.

The optical combiner 510 combines the reference laser and the frequency comb, and then outputs the combined optical signal to the supercontinuum generator 225. The supercontinuum generator 225 can then expand the spectral envelope of the frequency comb so that it overlaps with the frequency of the reference laser as discussed above. The resulting optical signal can then be detected by the PD 230 and the beat between the reference laser and one of the teeth in the frequency comb can be used to lock the frequency comb to the reference laser.

Thus, FIG. 5 illustrates one implementation of the combiner 310 in FIG. 3 that is integrated into the same PIC 305 that also includes the supercontinuum generator 225.

Figure 6:
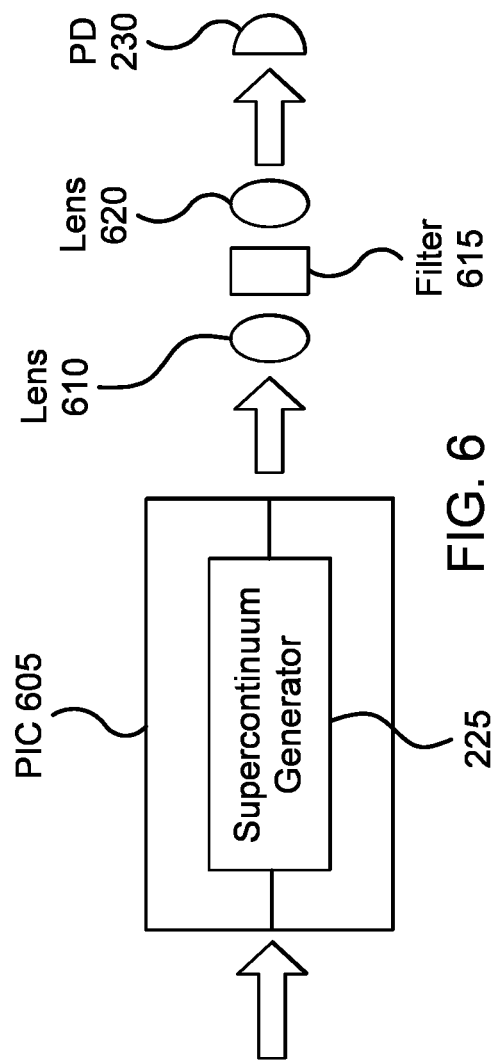
FIG. 6 illustrates filtering an optical signal output by supercontinuum generation, according to one embodiment described herein.

FIG. 6 illustrates filtering an optical signal output by supercontinuum generation, according to one embodiment described herein. While the previous embodiments illustrate directly coupling the PD 230 to an output of the PIC, FIG. 6 illustrates an optical system for filtering the optical signal output by supercontinuum generation before it is detected by the PD 230. As discussed in FIG. 1, the frequency comb includes many different teeth, but in order to lock the frequency comb to the reference laser, the beat between the reference laser and only one of the teeth is needed. The presence of the rest of the comb light does not provide any additional signal but contributes to the noise floor via the photon shot-noise. As a result, optical filtering of the PIC output can improve the signal-to-noise (SNR) ratio.

Instead, FIG. 6 illustrates passing the output signal produced by the supercontinuum generator 225 through a narrow bandpass filter 615 to remove some of the teeth. That is, the filter 615 may remove all but one, two, three, etc. of the teeth in the comb that are closest to the reference laser. When detected by the PD 230, this filtered optical signal can generate a high SNR beat note for frequency comb stabilization. It may be preferred to filter out all but the one of the teeth in the frequency comb that is closest to the reference laser, but this may be difficult to achieve.

FIG. 6 also includes a collimating lens 610 for collimating the optical signal transmitted by the PIC 605 before it passes through the filter 615. Collimating the optical signal may enable the use of a spectrally narrower bandpass filter 615, which then increases the SNR of the resulting electrical signal. After passing through the filter 615, a focusing lens 620 focuses the filtered optical signal onto the PD 230 where it is then detected.

The lens 610, filter 615, and lens 620 can be used in any of the embodiments discussed above in FIGS. 2-5. That is, the optical filtering shown in FIG. 6 can be used regardless of whether the reference laser and the frequency comb were combined using a separate combiner or combined using a combiner integrated on the PIC 605 that includes the supercontinuum generator 225.

Figure 7A:
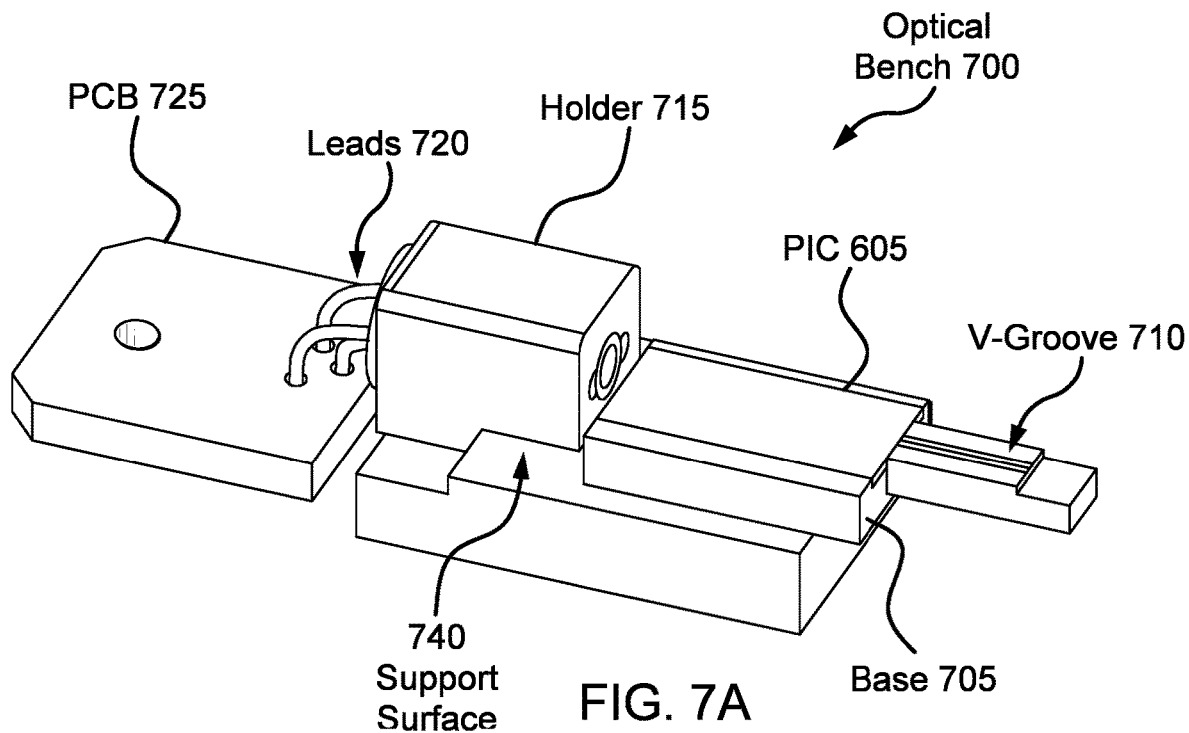
FIGS. 7A and 7B illustrate an optical bench for filtering an optical signal output by supercontinuum generation, according to one embodiment described herein.
Figure 7B:
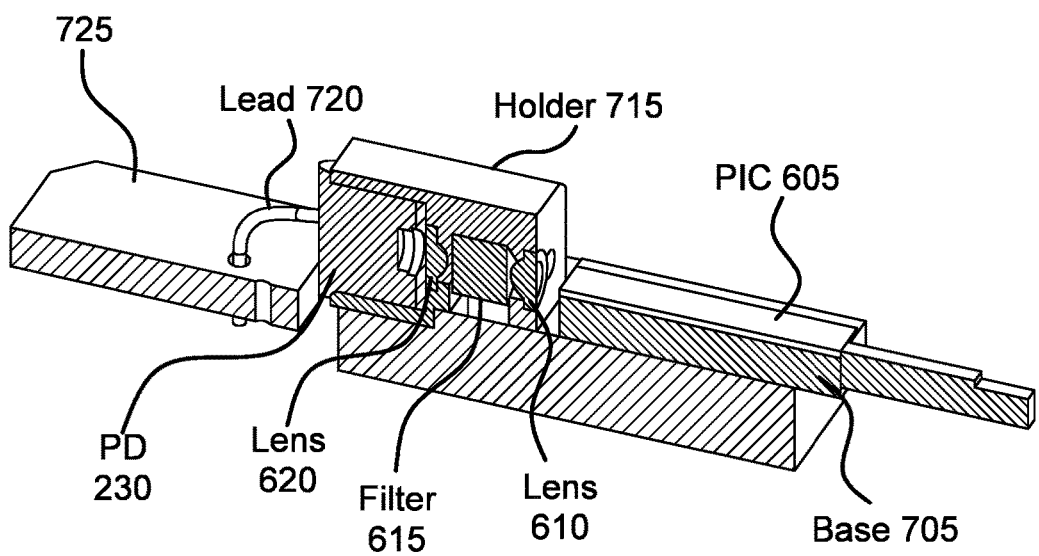

FIGS. 7A and 7B illustrate an optical bench 700 for filtering an optical signal output by supercontinuum generation, according to one embodiment described herein. That is, FIGS. 7A and 7B illustrate a holder 715 for supporting and aligning the optical components illustrated in FIG. 6. FIG. 7A illustrates a plan view of the optical bench 700 while FIG. 7B illustrates a cross-sectional view.

As shown, the PIC 605 is mounted on a base 705. Further, the base 705 can be attached to a V-groove 710 that aligns an optical fiber to the PIC 605. In this example, there is one optical fiber aligned to an edge of the PIC 605 which corresponds to the embodiments in FIGS. 2 and 4A where the reference laser and the frequency comb are combined by a separate combiner (e.g., a WDM). However, if implementing the embodiments in FIGS. 3 and 5, there could be two V-grooves that permit the two optical fibers transmitting the reference laser and the frequency comb to be aligned to the PIC 605.

As shown by the cross section in FIG. 7B, the holder 715 includes receptacles for holding the PD 230, the lens 620, the filter 615, and the lens 610 in optical alignment. For example, these optical components can be epoxied to the holder 715. In one embodiment, the holder 715 is a monolithic assembly. Further, the holder 715 may passively align the components within it—i.e., the PD 230, the lens 620, the filter 615, and the lens 610. For example, the alignment tolerances can be relaxed enough that the components can be glued or epoxied into the holder 715 without active alignment.

The PIC 605 may be mounted on the base 705 (e.g., using epoxy) and aligned to an optical fiber in the V-groove 710 in a separate manufacturing step. This partial component can then be mounted on a support surface 740 of the holder 715. While introducing light into the PIC 605 using the optical fiber, a technician can slide the base 705 on the support surface until the optical signal exiting an edge of the PIC 605 opposite the edge coupled to the V-groove 710 is detected by the PD 230. That is, the technician can align the PIC 605 with the lens 610 so that the optical signal passes through filter 615, the lens 620, and is detected by the PD 230. In this example, the PIC 605 is actively aligned to the optical components in the holder 715 to maximize light coupled into the PD 230. Once aligned, the base 705 can be attached to the support surface 740 (e.g., using epoxy) so that the PIC 605 remains fixedly attached to the holder 715 and aligned with the optical components therein.

The optical bench 700 includes leads 720 that connect the PD 230 to a printed circuit board (PCB) 725. The PCB 725 can be coupled to a computing device that detects the beat or beat note and adjusts the mode-locked laser to lock the frequency comb to the reference laser. In one embodiment, the PCB 725 can also include a transimpedance amplifier.

In other scenarios, the filter 615 may be spectrally broader in which case the optical signal generated by the PIC 605 does not have to be collimated before passing through the filter 615. In that example, the lens 610 and the lens 620 may be omitted from the optical bench 700. The optical signal emitted by the PIC 605 can pass through the filter 615 and be detected by the PD 230 without using any lenses.

The holder 715 can be a monolithic aluminum-nitride optical assembly. Aluminum nitride can be machined to create the holder 715 and is also a very rigid material with a high thermal conductivity to minimize thermal gradients. However, other suitable materials for the holder 715 include glass, copper tungsten, ceramic, and the like.

Figure 8:
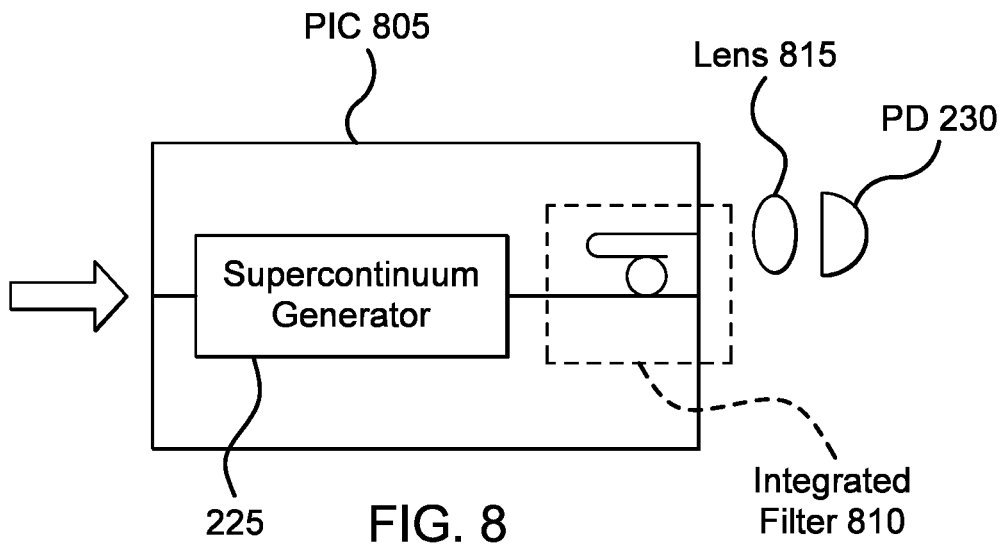
FIG. 8 illustrates filtering an optical signal output by supercontinuum generation using a photonic chip, according to one embodiment described herein.

FIG. 8 illustrates filtering an optical signal output by supercontinuum generation using a PIC 805, according to one embodiment described herein. In FIG. 8, the output of the supercontinuum generator 225 is coupled to an integrated filter 810. The filter 810 can perform the narrow bandpass filtering performed by the filter 615 in FIG. 6. The filter 810 can be a microresonator or an arrayed waveguide grating.

Performing the filtering on the PIC 805 eliminates aligning bulk optics to the PIC 805. For example, the filtered optical signal generated by the integrated filter 810 can be detected using the PD 230 with or without a focusing lens 815 and have the same performance as the optical system illustrated in FIG. 6 but with fewer optical components.

Figure 9:
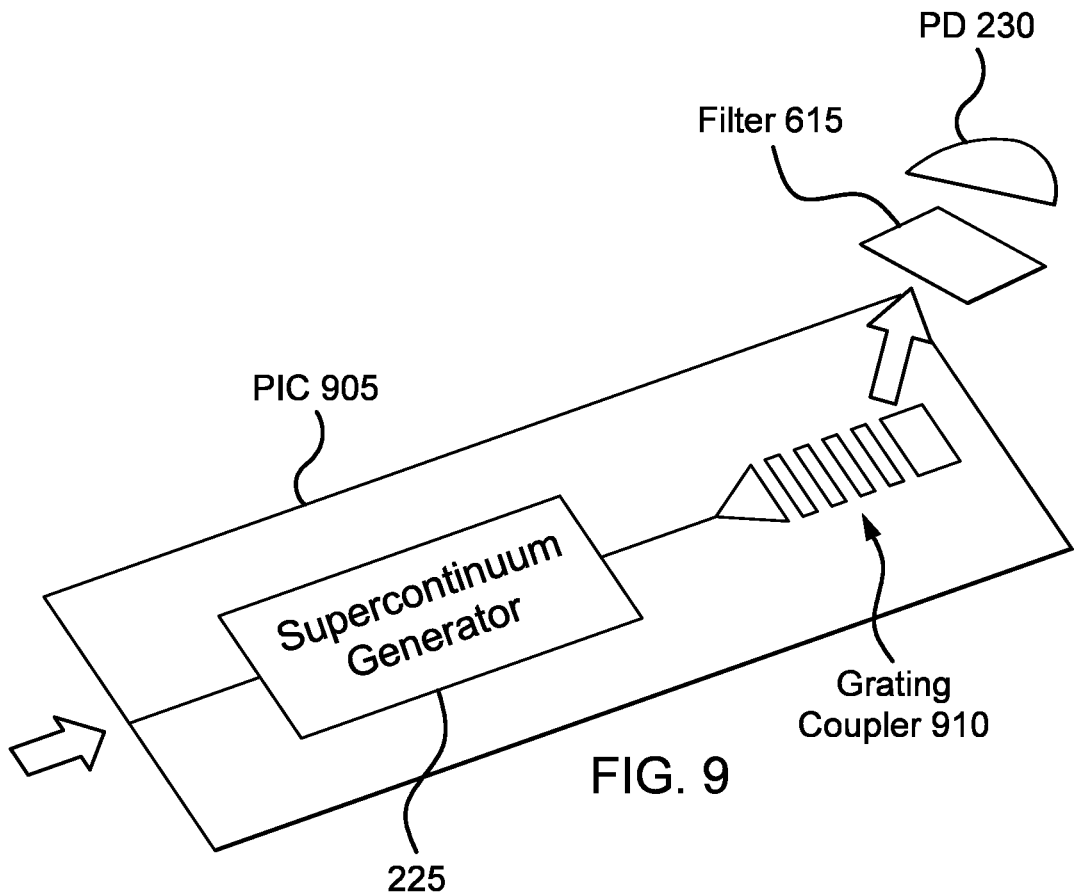
FIG. 9 illustrates using a grating coupler to output an optical signal produced by supercontinuum generation, according to one embodiment described herein.

FIG. 9 illustrates using a grating coupler 910 to output an optical signal produced by supercontinuum generation, according to one embodiment described herein. In this example, the grating coupler 910 in the PIC 905 is coupled to the output of the supercontinuum generator 225. Instead of an edge coupling as shown in FIGS. 7A and 7B, the grating coupler 910 enables vertical detection of the output optical signal. For example, the PD 230 can rest on a top surface of the PIC 905, facing the grating coupler 910.

The grating coupler 910 can provide some filtering of the optical signal since different wavelengths come out in different directions. The PD 230 can be arranged to detect only the desired wavelengths (e.g., the reference laser and at least one tooth in the frequency comb that has a similar wavelength as the reference laser) and not detect undesired wavelengths (e.g., teeth in the frequency comb that are farther from the reference laser). However, in FIG. 9, the filter 615 is disposed between the grating coupler 910 and the PD 230 to perform additional filtering, but this is optional. Further, instead of using an external filter 615, the PIC 905 could include an integrated filter 810 like in FIG. 8 that is disposed between the supercontinuum generator 225 and the grating coupler 910.

Figure 10:
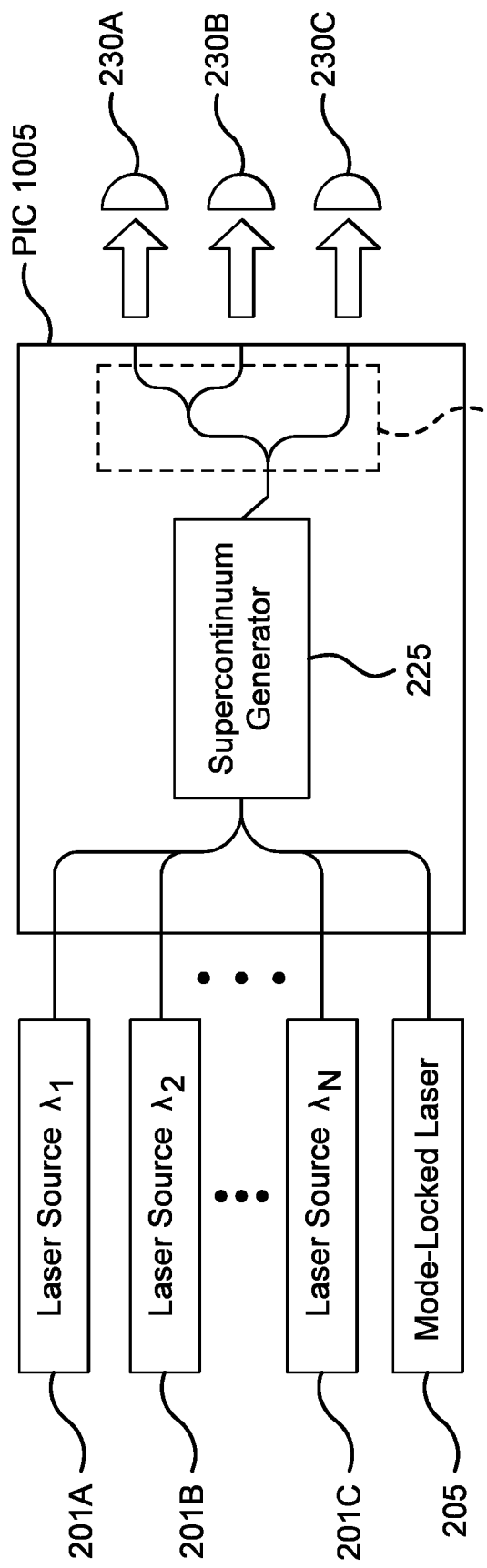
FIG. 10 illustrates combining more than two optical signals, according to one embodiment described herein.

FIG. 10 illustrates combining more than two optical signals, according to one embodiment described herein. As shown, a PIC 1005 receives multiple reference lasers generated by different laser sources 201A-C along with the frequency comb generated by the mode-locked laser 205. The reference lasers can be combined with the frequency comb using an optical combiner as discussed in, e.g., FIGS. 3 and 5. For example, some applications may want to perform a clock comparison of reference lasers generated by different clock systems. Put differently, the reference lasers can each be generated by a different laser locking system or technique. The reference lasers can be combined by the PIC 1005, pass through the supercontinuum generator 225 so that the reference lasers are all within the envelope of the frequency comb and then split out the signals so their beats relative to a tooth within the frequency comb can be separately measured by the PDs 230A-C. By evaluating the beats, the system can compare the frequency instabilities between the frequency comb and each of the reference lasers.

The PIC 1005 includes a demultiplexer 1010 to split out the signals for the different PDs 230A-C. That is, the demultiplexer 1010 can separate out various colors on the PIC 1005 to obtain multiple beat notes.

While FIG. 10 illustrates evaluating three reference lasers, the system could instead evaluate the frequency instabilities of two reference lasers, four reference lasers, etc.

In another embodiment, instead of combining the optical signals within the PIC 1005, they could instead be combined using a separate combiner such as a different PIC or a WDM as discussed in FIGS. 2, 4A, and 4B. In that case, only one optical fiber may be aligned to the PIC 1005. Also, instead of directly detecting the three output signals using the PDs 230A-C, the system could include one or more lenses and the filters discussed in FIGS. 6-8 that filter the optical signals before they are detected by the PDs 230A-C.

Figure 11:
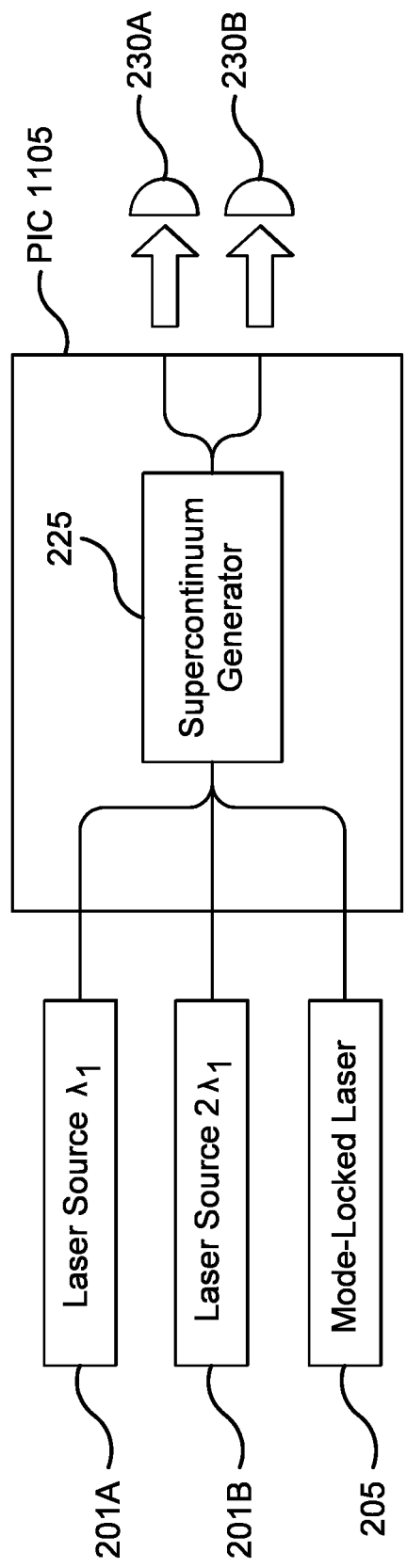
FIG. 11 illustrates combining more than two optical signals, according to one embodiment described herein.

FIG. 11 illustrates combining more than two optical signals, according to one embodiment described herein. As shown, a PIC 1105 receives multiple reference lasers generated by the laser sources 201A and 201B along with the frequency comb generated by the mode-locked laser 205. The reference lasers can be combined with the frequency comb using an optical combiner as discussed in, e.g., FIGS. 3 and 5.

In one embodiment, the reference laser is frequency doubled relative to the reference laser. The resulting beats could be used to fully stabilize the frequency comb. Because the reference lasers are separated by an octave, they should beat with two different teeth in the frequency comb also separated by an octave. That is, the PD 230A can detect a beat between the reference laser generated by the laser source 201A and a first tooth in the frequency comb while the PD 230B detects a beat between the reference laser generated by the laser source 201B and a second tooth in the frequency comb. For example, a laser system can generate both 1064 nm and 532 nm reference lasers that can be heterodyned with two different teeth in the frequency comb.

Advantageously, by using reference lasers that are separated by one (or more) octaves, the frequency comb can be fully stabilized without having to detect a carrier envelope offset frequency ($F_{CEO}$) of the frequency comb.

While FIG. 11 illustrates evaluating two reference lasers, the system could any two harmonics of the reference laser within the comb bandwidth to fully stabilize the comb.

In another embodiment, instead of combining the optical signals within the PIC 1105, they could be instead be combined using a separate combiner such as a different PIC or a WDM as discussed in FIGS. 2, 4A, and 4B. In that case, only one optical fiber may be aligned to the PIC 1105. Also, instead of directly detecting the two output signals using the PDs 230A-B, the system could include one or more lenses and the filters discussed in FIGS. 6-8 that filter the optical signals before they are detected by the PDs 230A-B.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

As will be appreciated by one skilled in the art, the embodiments disclosed herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system, comprising:
a photonic integrated circuit (PIC) comprising a supercontinuum generator; and
a combiner configured to combine a reference laser and a frequency comb, wherein an output of the combiner is coupled to an input of the supercontinuum generator.

2. The system of claim 1, wherein the combiner is a wavelength division multiplexer (WDM), wherein a first optical fiber configured to transmit the reference laser is coupled to a first input of the WDM, a second optical fiber configured to transmit the frequency comb is coupled to a second input of the WDM, and a third optical fiber is coupled to an output of the WDM and an input of the PIC.

3. The system of claim 1, further comprising:
a second PIC comprising the combiner, wherein a first optical fiber configured to transmit the reference laser is coupled to a first input of the second PIC, a second optical fiber configured to transmit the frequency comb is coupled to a second input of the second PIC, and an optical interface of the second PIC is coupled to an optical interface of the PIC.

4. The system of claim 3, wherein the second PIC is formed from a material different from a material of the PIC.

5. The system of claim 1, wherein the combiner is integrated in the PIC, wherein a first optical fiber configured to transmit the reference laser is coupled to a first input of the PIC, a second optical fiber configured to transmit the frequency comb is coupled to a second input of the PIC.

6. The system of claim 1, further comprising:
a bandpass filter optically coupled to an output of the supercontinuum generator; and
a photodiode configured to receive a filtered optical signal from the bandpass filter.

7. The system of claim 6, further comprising:
a collimating lens disposed between the bandpass filter and the output of the supercontinuum generator; and
a focusing lens disposed between the bandpass filter and the photodiode.

8. The system of claim 7, further comprising:
a holder comprising receptacles that hold and align the bandpass filter, the photodiode, the collimating lens, and the focusing lens, wherein the PIC is attached to the holder.

9. The system of claim 6, wherein the bandpass filter is integrated into the PIC.

10. The system of claim 6, wherein the PIC comprises:
a grating coupler coupled to an output of the supercontinuum generator, the grating coupler is optically coupled to the bandpass filter and the photodiode.

11. The system of claim 1, wherein the combiner is configured to combine a plurality of reference lasers with the frequency comb.

12. The system of claim 11, wherein the plurality of reference lasers are generated using different atomic clock systems and have different frequencies.

13. The system of claim 11, wherein the plurality of reference lasers each have different frequencies that are separated by one or more octaves.

14. A method, comprising:
combining a reference laser and a frequency comb to generate a combined optical signal; and
performing supercontinuum generation on the combined optical signal.

15. The method of claim 14, wherein the reference laser has a frequency that is outside of a spectral envelope of the frequency comb, wherein the supercontinuum generation expands the spectral envelope of the frequency comb so that the reference laser is within the spectral envelope.

16. The method of claim 14, wherein the supercontinuum generation is performed in a PIC.

17. The method of claim 16, wherein the optical combining is performed in an optical component separate from the PIC.

18. The method of claim 16, wherein the optical combining is performed within the PIC.

19. The method of claim 14, further comprising:
bandpass filtering the optical signal generated by the supercontinuum generation to generate a filtered optical signal.

20. The method of claim 19, further comprising:
collimating the optical signal before band-pass filtering the optical signal; and
focusing the bandpass filtered optical signal onto a photodiode.

* * * * *